United States Patent
Sawaguchi et al.

(10) Patent No.: US 6,494,620 B1
(45) Date of Patent: Dec. 17, 2002

(54) FLUID BEARING AND ROTARY DRIVE APPARATUS USING THE SAME

(75) Inventors: Kazuya Sawaguchi, Ami-machi (JP); Michio Horikoshi, Moriya-machi (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 09/669,834

(22) Filed: Sep. 27, 2000

(30) Foreign Application Priority Data

Oct. 7, 1999 (JP) .............................................. 11-286249

(51) Int. Cl.⁷ ................................................. F16C 17/10
(52) U.S. Cl. ........................................ 384/107; 384/121
(58) Field of Search .................................. 384/107, 112, 384/114, 123, 121

(56) References Cited

U.S. PATENT DOCUMENTS 5,142,172 A    8/1992   Horikoshi et al. ............ 310/13

FOREIGN PATENT DOCUMENTS

| JP | 63-176817 | 7/1988 |
| JP | 2711584   | 10/1997 |

*Primary Examiner*—Lenard A. Footland
(74) *Attorney, Agent, or Firm*—Fitzpatrick, Cella, Harper & Scinto

(57) ABSTRACT

A fluid bearing includes a rotary body with a rotor having a cylindrical surface to be borne and a thrust plate arranged at least at an end of the rotor, and a housing including a radial bearing section arranged vis-a-vis the surface of the rotor and a thrust bearing section arranged vis-a-vis the thrust plate. The thrust plate has a hole bored around the axis of rotation of the rotary body and the inner diameter of the hole is greater at the rotor side than at the opposite side.

9 Claims, 6 Drawing Sheets

FLUID BEARING AND ROTARY DRIVE APPARATUS USING THE SAME

BACKGROUND OF THE INVENTION

1. Field of the Invention

This invention relates to a fluid bearing adapted to support a rotary body such as a rotating shaft of a machine tool in a non-contact fashion by means of the static or dynamic pressure of the fluid found in the bearing clearances of the bearing and also to a rotary drive apparatus using such a fluid bearing.

2. Related Background Art

Fluid bearings including gas bearings such as static pressure gas bearings and dynamic pressure gas bearings are advantageous in that the movable member such as a rotating shaft supported by the bearing can move lightly, smoothly and accurately because the bearing produces little frictional resistance. Therefore, such bearings are popularly used with high speed rotating shafts of precision machine tools and other tools that require an enhanced level of operational precision.

Generally, static pressure gas bearings have orifices for releasing a jet stream of gas into the bearing clearances between the bearing and the rotary body supported by it, which orifices may be of the self-formation type, the surface type or the porosity type. The bearing of this type structurally comprises a radial bearing section for radially supporting the rotary body and thrust bearing sections for axially supporting the rotary body, which bearing sections define respective bearing clearances with the rotor and the thrust plates of the rotary body that face them respectively, into which a jet stream of gas is released through any of the orifices in order to support the rotary body in a floating state. The bearing clearances of a static pressure gas bearing are very narrow and normally between several microns and tens of several microns.

In the case of dynamic pressure gas bearings, on the other hand, helical or herring-bone-shaped dynamic pressure generating grooves that are several to tens of several microns deep are formed on the rotor and the thrust plate of the rotary body supported by the bearing or the bearing surfaces facing them and dynamic pressure is generated by drawing the air in the bearing clearances between the rotor and the thrust plate of the rotary body and the corresponding bearing surfaces into the dynamic pressure generating grooves in order to support the rotary body in a floating state. As in the case of static pressure gas bearings, the bearing clearances of a dynamic pressure gas bearing are very narrow and normally between several microns and tens of several microns.

Note that the rotor and the thrust plate of a rotary body supported by a fluid bearing may be partly integral with each other or bonded to each other by means of one or more than one bolt.

FIG. 1 of the accompanying drawings is a schematic cross sectional view of a known fluid bearing having a configuration as described above. Referring to FIG. 1, the rotary body comprises a rotor 111 having a cylindrical surface to be borne on the bearing and a pair of thrust plates 112 bonded respectively to the opposite ends of the rotor 111 by means of bolts (not shown). The rotary body is rotatably supported by a bearing housing 101 in a non-contact fashion. The bearing housing 101 comprises a radial bearing section having a pair of porous radial bearing pads 102 having surfaces arranged vis-à-vis the cylindrical surface of the rotor 111 of the rotary body and a pair of thrust bearing sections having respective porous thrust bearing pads 103 having surfaces arranged vis-à-vis the respective surfaces of the thrust plates 112. The radial bearing pads 102 and the thrust bearing pads 103 are rigidly secured to the bearing housing 101 by means of shrinkage fitting, adhesive or some other appropriate measure.

Pressurized gas fed from a high pressure gas supply source (not shown) is delivered to each of the radial bearing pads 102 and the thrust bearing pads 103 by way of pressurized gas supply port 101a of the bearing housing 101 and made to hit the surfaces of the rotor 111 and the thrust plates 112 facing the respective bearing sections before being moved away to the outside by way of the outer periphery of the surfaces of the thrust plates facing the bearing sections and the exhaust port 101b. The rotary body is supported by the bearing in a non-contact fashion under the effect of the static pressure of the fluid injected into the bearing clearances.

The thrust plates 112 and the rotor 111 are provided with a central through hole formed around the axis of rotation of the rotary body and the inner peripheral surfaces 112a of the through holes of the thrust plates 112 define a uniform inner diameter $A_0$.

However, the above described known fluid bearing has a drawback that, as the gas bearing is driven to rotate at high speed, the rotor and the thrust plates are deformed by the generated centrifugal force to allow the thrust plates to fall and locally reduce the sizes of the bearing clearances. As a result, problems such as scoring and seizure occur. More specifically, a rotating cylindrical or disk-shaped member produces an outward displacement that is proportional to the outer diameter thereof so that the thrust plates having an outer diameter greater than that of the rotor is displaced much more than the latter to consequently change the sizes of the bearing clearances.

FIG. 2 of the accompanying drawings schematically shows the rotor and the thrust plates in cross section when they are stopped (as indicated by $S_1$) and when they are rotating (as indicated by $S_2$). It is known that, as the rotor and the thrust plates that are dimensionally differentiated from the rotor are bonded to each other and driven to rotate, the thrust plates fall toward the rotor. In other words, since the thrust plates that are trying to move outward are arrested by the rotor at the bonded areas, the rotor that is pulled by the thrust plates expands at and near the bonded areas while the thrust plates that are pulled by the rotor tend to fall onto the rotor. In FIG. 2, R denotes the axis of rotation of the rotary body.

As the rotary body is deformed in this way, the bearing clearances of the radial bearing section and the thrust bearing sections are locally dimensionally reduced so that those sections eventually contact the rotor and the thrust plates to give rises to problems such as scoring and seizure. If the bearing clearances are dimensionally reduced too much, those sections easily come to contact the rotary body to make the gas bearing inoperative once the gas bearing is driven to rotate.

The problem of falling thrust plates may be avoided by arranging an object having a profile same as the rotor to the other side of each of the thrust plates. However, the other side is often used to arrange there a motor or a jig whose profile is mostly determined as a function of the operating conditions and the purpose of its use so that it is highly difficult to make it show a profile that is optimal for suppressing the deformation of the thrust plates.

Meanwhile, there have been proposals for designing the parts of the rotor and the thrust plates that are apt to be deformed most or the corresponding parts of the bearing so as to accommodate the deformation produced as a result of the falling phenomenon of the thrust plates. Japanese Patent Application Laid-Open No. 63-176817 describes such a rotor while Japanese Patent Application Laid-Open No. 2711584 discloses such a thrust plate.

However, the bearing clearances are designed to show an optimal profile after the rotor and the thrust plates are deformed as a result of rotation of the rotary body. In other words, they do not show an optimal profile when the rotary body is stationary and therefore the gas bearing performs only poorly at the time when the rotary body starts rotating or when it is rotating at low speed.

SUMMARY OF THE INVENTION

In view of the above circumstances, it is therefore the object of the present invention to provide a fluid bearing that can effectively prevent the phenomenon of falling thrust plates that can be caused by the centrifugal force generated when rotating at high speed without sacrificing the performance of the bearing at the start and during the low speed rotary operation and also a rotary drive apparatus using such a fluid bearing.

According to the invention, the above object is achieved by providing a fluid bearing comprising:

- a rotary body including a rotor having a cylindrical surface to be borne and at least a thrust plate arranged at an end of the rotor in the sense of axis of rotation; and
- a housing including a radial bearing section arranged vis-à-vis said surface of said rotor and a thrust bearing section arranged vis-à-vis said thrust plate;
- said thrust plate having a hole bored around the axis of rotation of the rotary body, the inner diameter of said hole being greater at the rotor side than at the opposite side.

In another aspect of the invention, there is also provided a fluid bearing comprising:

- a rotary body including a rotor having a cylindrical surface to be borne and at least a thrust plate arranged at an end of the rotor in the sense of axis of rotation; and
- a housing including a radial bearing section arranged vis-à-vis said surface of said rotor and a thrust bearing section arranged vis-à-vis said thrust plate;
- the outer diameter of said thrust plate being greater at the rotor side than at the opposite side.

In still another aspect of the invention, there is provided a rotary drive apparatus comprising a fluid bearing according to the invention and a motor for driving said rotary body to rotate.

DESCRIPTION OF THE PREFERRED EMBODIMENTS

Now, the present invention will be described in greater detail by referring to the accompanying drawings that illustrate preferred embodiments of the invention.

Figure 3:
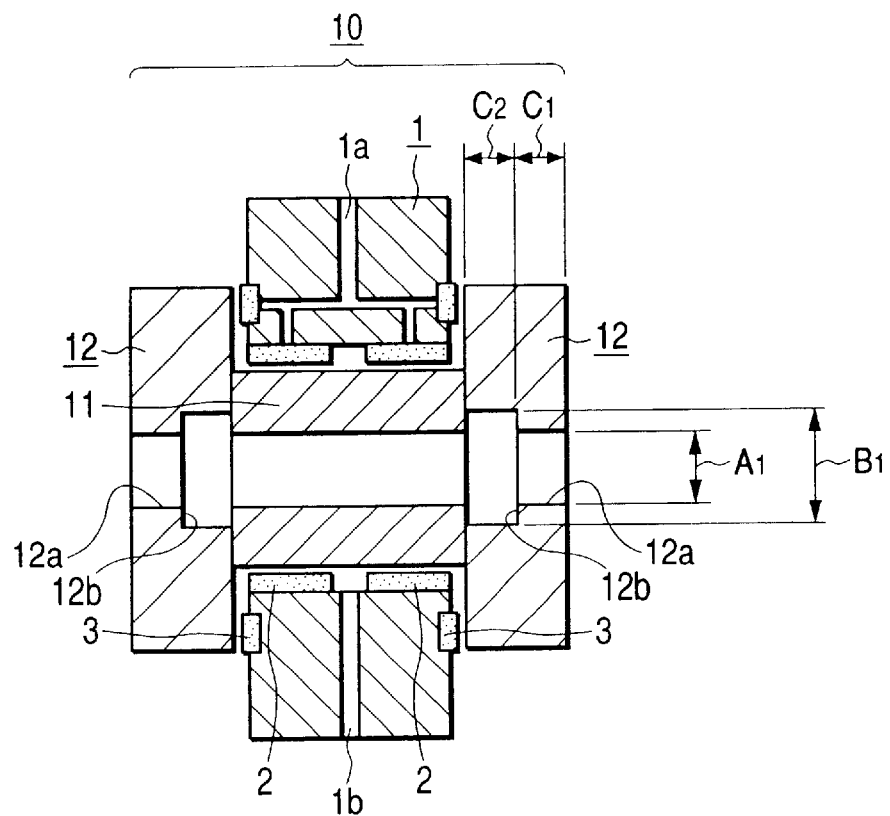
FIG. 3 is a schematic cross sectional view of a first embodiment of fluid bearing according to the invention.

FIG. 3 is a schematic cross sectional view of a first embodiment of fluid bearing according to the invention. Referring to FIG. 3, rotary body 10 comprises a rotor 11 having a cylindrical surface to be borne on the bearing and a pair of thrust plates 12 bonded respectively to the opposite ends of the rotor 11 by means of bolts (not shown). The rotary body 10 is rotatably supported by a bearing housing 1 in a non-contact fashion. The bearing housing 1 comprises a radial bearing section having a pair of porous radial bearing pads 2 having surfaces arranged vis-à-vis the cylindrical surface of the rotor 11 of the rotary body 10 and a pair of thrust bearing sections having respective porous thrust bearing pads 3 having surfaces arranged vis-à-vis the respective surfaces of the thrust plates 12. The radial bearing pads 2 and the thrust bearing pads 3 are rigidly secured to the bearing housing 1 by means of shrinkage fitting, adhesive or some other appropriate measure.

Pressurized gas fed from a high pressure gas supply source (not shown) is delivered to each of the radial bearing pads 2 and the thrust bearing pads 3 by way of pressurized gas supply port 1a of the bearing housing 1 and made to hit the surfaces of the rotor 11 and the thrust plates 12 facing the respective bearing sections before being moved away to the outside by way of the outer periphery of the surfaces of the thrust plates 12 facing the bearing sections and the exhaust port 1b. The rotary body 10 is supported by the bearing in a non-contact fashion under the effect of the static pressure of the fluid injected into the bearing clearances.

As the rotary body 10 is driven to rotate by a motor (not shown), the rotor 11 and the thrust plates 12 are radially expanded by the generated centrifugal force generated there. However, since the thrust plates 12 are bonded to the relatively small rotor 11 at the rotor sides thereof, the displacement of the thrust plates 12 is reduced at the rotor sides thereof to give rise to a falling phenomenon of the thrust plates 12.

With this embodiment, the inner peripheral surfaces 12a of the holes provided in the thrust plates 12 are made to show a step 12b so that the inner diameter of the holes of the thrust plates 12 is smaller at the sides opposite to the rotor than at the sides facing the rotor. With this arrangement, the displacement of the thrust plates due to the centrifugal force can be reduced at the sides opposite to the rotor. In other words, in each of the thrust plates 12, the displacement of the side of the thrust plate 12 bonded to and located near the rotor 11 and that of the opposite side of the thrust plate 12 can be equalized to eliminate any risk of falling of the thrust plate 12 toward the rotor by optimizing the inner diameter $\phi A_1$ (which may be equal to zero) of the inner periphery 12a and the height $C_1$ of the part having the reduced diameter and located at the side opposite to the rotor and the inner diameter $\phi B_1$ of the inner periphery 12a and the height $C_2$ of the part having the large diameter and located at the side of the rotor under the given conditions.

Thus, with this embodiment, the risk of falling of the thrust plates and hence that of scoring and seizure of the bearing at the time of high speed rotation can be effectively avoided by preventing the displacement of each of the thrust plates from being differentiated between the rotor side and the side opposite to the rotor.

Additionally, this embodiment of fluid bearing according to the invention provides a remarkable advantage that it operates highly efficiently at the time when the rotary body starts rotating or when it is rotating at low speed if compared with known fluid bearings where the parts of the rotor and the thrust plates that are apt to be deformed most or the corresponding parts of the bearing are so designed as to accommodate the deformation produced as a result of the falling phenomenon of the thrust plates.

Figure 1:
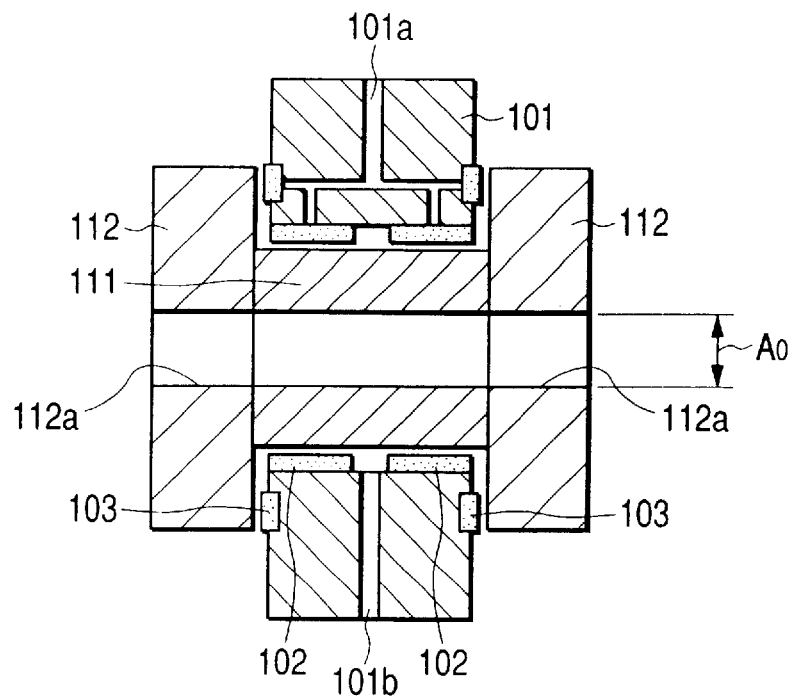
FIG. 1 is a schematic cross sectional view of a known fluid bearing, illustrating its configuration.
Figure 2:
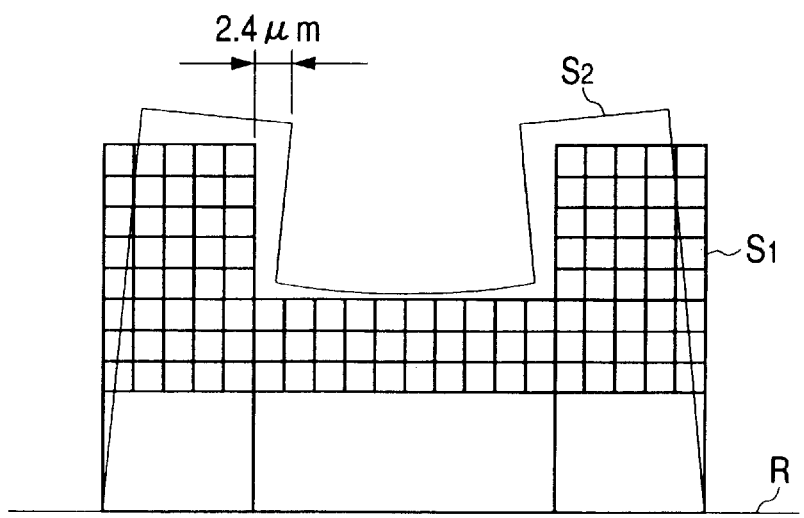
FIG. 2 is a schematic cross sectional view of the rotor and the thrust plates of the fluid bearing of FIG. 1 when they are stopped and when they are rotating.
Figure 4:
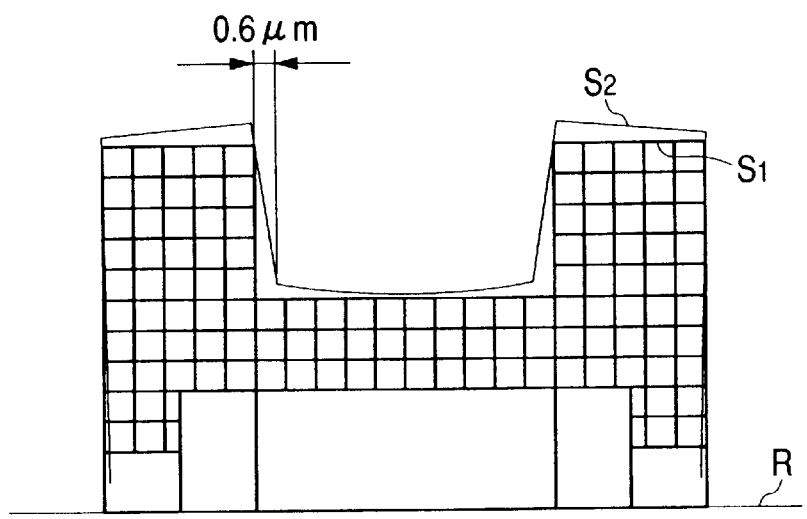
FIG. 4 is a schematic cross sectional view of the rotor and the thrust plates of the fluid bearing of FIG. 3 when they are stopped and when they are rotating.

FIG. 4 is a schematic cross sectional view of the rotor and the thrust plates of the above embodiment of fluid bearing when they are stopped (as indicated by $S_1$) and when they are rotating (as indicated by $S_2$). While the thrust plates of the known fluid bearing of FIG. 2 fall by 2.4 $\mu$m, the fall of their counterparts of this embodiment is reduced to 0.6 $\mu$m as shown in FIG. 4. In FIG. 4, R denotes the axis of rotation of the rotary body.

Figure 5:
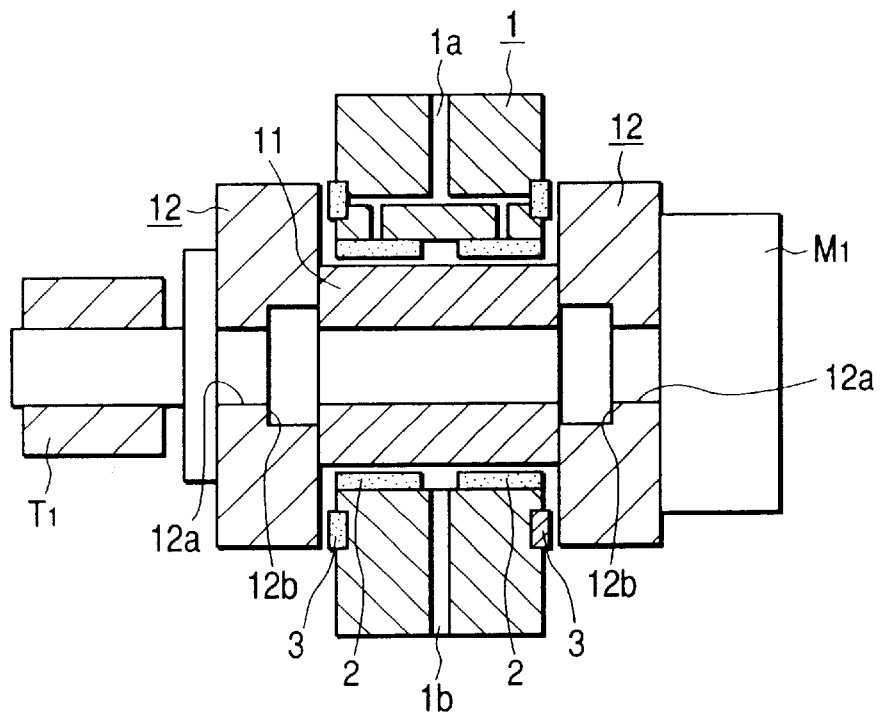
FIG. 5 is a schematic cross sectional view of a rotary drive apparatus realized by using the fluid bearing of FIG. 3.

FIG. 5 is a schematic cross sectional view of a rotary drive apparatus realized by using the fluid bearing of FIG. 3. In FIG. 5, the components that are the same as those of FIG. 3 are denoted respectively by the same reference symbols and will not be described any further.

In the rotary drive apparatus illustrated in FIG. 5, the rotating part of motor $M_1$ is fitted to one of the thrust plates 12 while jig $T_1$ is fitted to the other thrust plate 12. With a rotary drive apparatus having the above described configuration, again, any risk of falling of the thrust plates 12 toward the rotor can be eliminated by making the inner diameter of the hole of each of the thrust plates greater at the rotor side than at the opposite side and optimising the dimensions of the hole, taking the overall configuration of the apparatus into consideration.

The dimensions of the thrust plates including those of the holes can be easily optimized by using an appropriate analytical method such as the method of finite elements. Additionally, as a result of experiments, it has been found that a fluid bearing provides satisfactory effects when the difference between the largest inner diameter $\phi B$, and the smallest inner diameter $\phi A_1$ of the holes of the thrust plates is not smaller than 3 mm.

Figure 6:
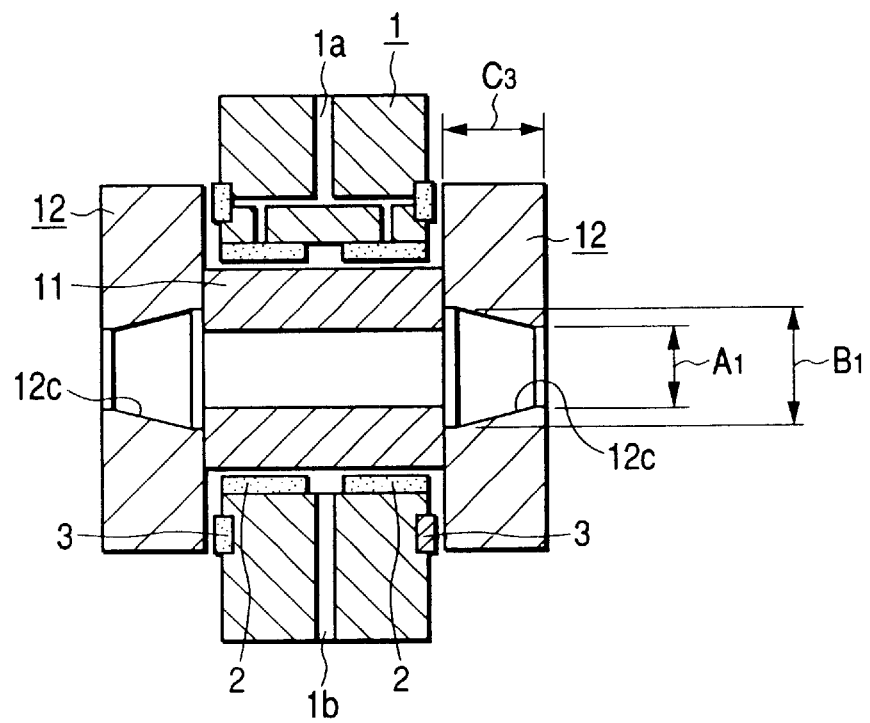
FIG. 6 is a schematic cross sectional view of a fluid bearing realized by modifying the first embodiment.

FIG. 6 is a schematic cross sectional view of a fluid bearing realized by modifying the first embodiment. In this embodiment, the holes of the thrust plates 12 are tapered from the rotor side and the inner diameter of the inner periphery 12c of the hole of each of the thrust plates 12 is reduced from $\phi B_1$ at the rotor side to $\phi A_1$ at the opposite side. With this arrangement again, the risk of falling of the thrust plates 12 toward the rotor is eliminated by optimizing the inner diameters $\phi A_1$, $\phi B_1$, and the height $C_3$ of the thrust plates 12. Note that, in FIG. 6, the components that are same as those of FIG. 3 are denoted respectively by the same reference symbols and will not be described any further.

Figure 7:
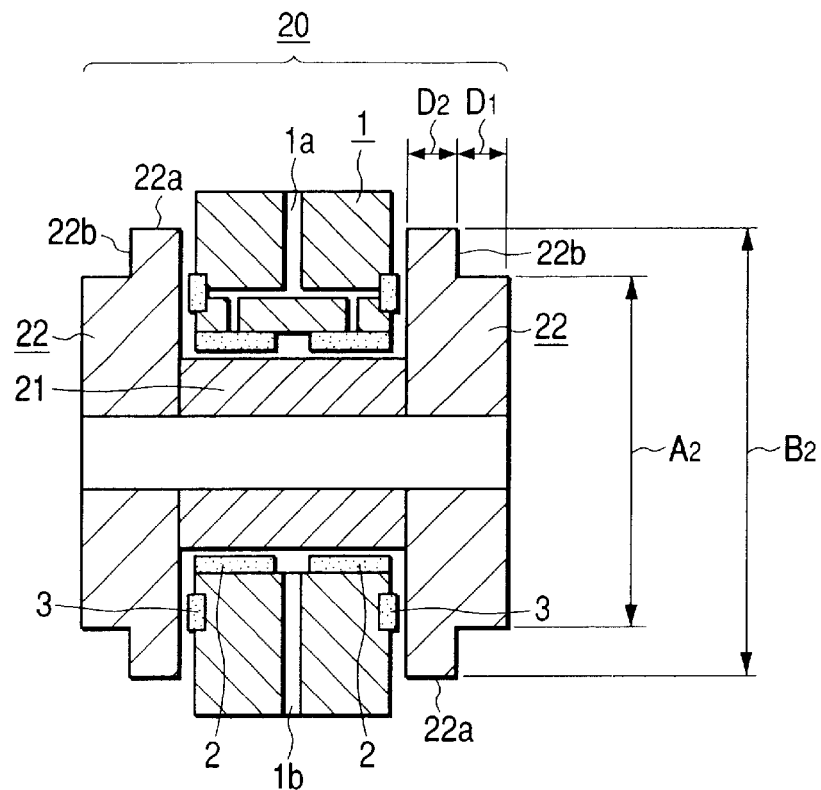
FIG. 7 is a schematic cross sectional view of a second embodiment of fluid bearing according to the invention.

FIG. 7 is a schematic cross sectional view of a second embodiment of fluid bearing according to the invention. Note that, in FIG. 7, the components that are the same as those of FIG. 3 are denoted respectively by the same reference symbols and will not be described any further. This embodiment differs from the first embodiment of FIG. 3 in that the rotary body 10 is replaced by rotary body 20 that comprises a rotor 21 having a cylindrical surface to be borne on the bearing and a pair of thrust plates 22 bonded respectively to the opposite ends of the rotor 21 by means of bolts (not shown). The bearing housing 1 of this embodiment has a configuration the same as its counterpart of the embodiment of fluid bearing of FIG. 3.

Pressurized gas fed from a high pressure gas supply source (not shown) is delivered to each of the radial bearing pads 2 and the thrust bearing pads 3 by way of pressurized gas supply port 1a of the bearing housing 1 and made to hit the surfaces of the rotor 21 and the thrust plates 22 facing the respective bearing sections before being moved away to the outside by way of the outer periphery of the surfaces of the thrust plates 22 facing the bearing sections and the exhaust port 1b.

As the rotary body 20 is driven to rotate by a motor (not shown), the rotor 21 and the thrust plates 22 are radially expanded by the generated centrifugal force generated there. However, since the thrust plates 22 are bonded to the relatively small rotor 21 at the rotor sides thereof, the displacement of the thrust plates 22 is reduced at the rotor sides thereof to give rise to a falling phenomenon of the thrust plates 22.

With this embodiment, the outer peripheral surfaces 22a of the thrust plates 22 are made to show a step 22b so that the outer diameter of the thrust plates 22 is smaller at the sides opposite to the rotor than at the sides facing the rotor. With this arrangement, the displacement of the thrust plates due to the centrifugal force can be reduced at the sides opposite to the rotor. In other words, in each of the thrust plates 22, the displacement of the side of the thrust plate 22 bonded to and located near the rotor 21 and that of the opposite side of the thrust plate 22 can be equalized to eliminate any risk of falling of the thrust plate 22 toward the rotor by optimising the outer diameter $\phi A_2$ and the height $D_1$ of the part of the thrust plate 22 located at the side opposite to the rotor and the outer diameter $\phi B_2$ and the height $D_2$ of the part of the thrust plate 22 located at the side of the rotor under the given conditions.

Thus, with this embodiment, the risk of falling of the thrust plates and hence that of scoring and seizure of the bearing at the time of high speed rotation can be effectively avoided by preventing the displacement of each of the thrust plates from being differentiated between the rotor side and the side opposite to the rotor.

Additionally, this embodiment of fluid bearing according to the invention provides a remarkable advantage that it operates highly efficiently at the time when the rotary body starts rotating or when it is rotating at low speed if compared with known fluid bearings where the parts of the rotor and the thrust plates that are apt to be deformed most or the corresponding parts of the bearing are so designed as to accommodate the deformation produced as a result of the falling phenomenon of the thrust plates.

Figure 8:
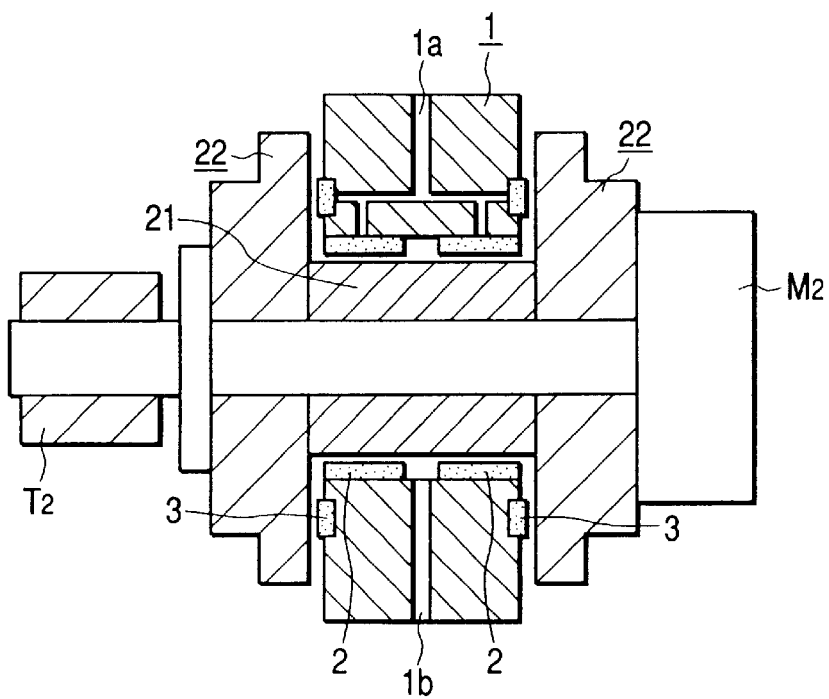
FIG. 8 is a schematic cross sectional view of a rotary drive apparatus realized by using the fluid bearing of FIG. 7.

FIG. 8 is a schematic cross sectional view of a rotary drive apparatus realized by using the fluid bearing of FIG. 7. In FIG. 8, the components that are the same as those of FIG. 7 are denoted respectively by the same reference symbols and will not be described any further.

In the rotary drive apparatus illustrated in FIG. 8, the rotating part of motor $M_2$ is fitted to one of the thrust plates 22 while jig $T_2$ is fitted to the other thrust plate 22. With a rotary drive apparatus having the above described configuration, again, any risk of falling of the thrust plates 22 toward the rotor can be eliminated by making the outer diameter of each of the thrust plates greater at the rotor side than at the opposite side and optimising the values of the outer diameter, taking the overall configuration of the apparatus into consideration.

The dimensions of the thrust plates including the outer diameter thereof can be easily optimised by using an appropriate analytical method such as the method of finite elements. Additionally, as a result of experiments, it has been found that a fluid bearing provides satisfactory effects when the difference between the largest outer diameter $\phi B_2$ and the smallest outer diameter $\phi A_2$ of the thrust plates is not smaller than 3 mm.

Figure 9:
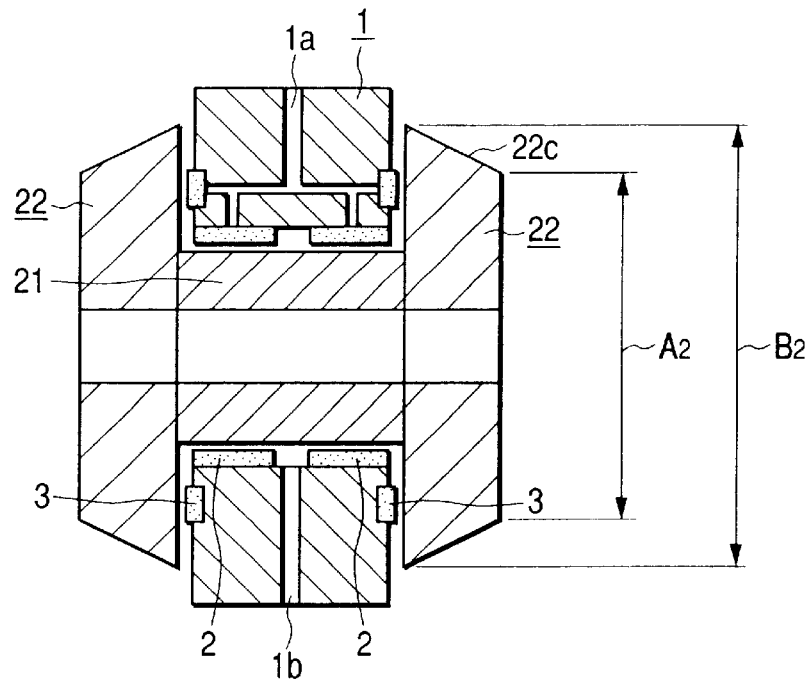
FIG. 9 is a schematic cross sectional view of a fluid bearing realized by modifying the second embodiment.

FIG. 9 is a schematic cross sectional view of a fluid bearing realized by modifying the second embodiment. In this embodiment, the thrust plates 22 are tapered from the rotor side and the outer diameter of the outer periphery 22c of each of the thrust plates 22 is reduced from $\phi B_2$ at the rotor side to $\phi A_2$ at the opposite side. With this arrangement again, the risk of falling of the thrust plates 22 toward the rotor is eliminated by optimising the outer diameters $\phi A_2$, $\phi B_2$ and the height of the thrust plates 22. Note that, in FIG. 9, the components that are the same as those of FIG. 7 are denoted respectively by the same reference symbols and will not be described any further.

Figure 10:
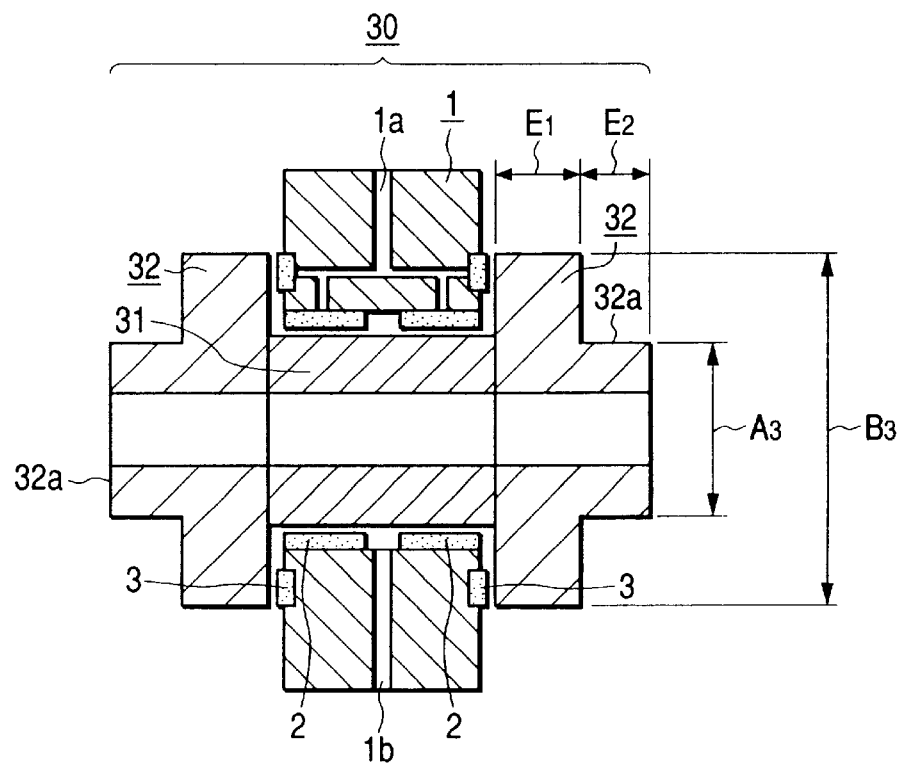
FIG. 10 is a schematic cross sectional view of a third embodiment of fluid bearing according to the invention.

FIG. 10 is a schematic cross sectional view of a third embodiment of fluid bearing according to the invention. Note that, in FIG. 10, the components that are the same as those of FIG. 3 are denoted respectively by the same reference symbols and will not be described any further. This embodiment differs from the first embodiment of FIG. 3 in that the rotary body 10 is replaced by rotary body 30 that comprises a rotor 31 having a cylindrical surface to be borne on the bearing and a pair of thrust plates 32 bonded respectively to the opposite ends of the rotor 31 by means of bolts (not shown). The bearing housing 1 of this embodiment has a configuration the same as its counterpart of the embodiment of fluid bearing of FIG. 3.

Pressurized gas fed from a high pressure gas supply source (not shown) is delivered to each of the radial bearing pads 2 and the thrust bearing pads 3 by way of pressurized gas supply port 1a of the bearing housing 1 and made to hit the surfaces of the rotor 31 and the thrust plates 32 facing the respective bearing sections before being moved away to the outside by way of the outer periphery of the surfaces of the thrust plates 32 facing the bearing sections and the exhaust port 1b.

As the rotary body 30 is driven to rotate by a motor (not shown), the rotor 31 and the thrust plates 32 are radially expanded by the generated centrifugal force generated there. However, since the thrust plates 32 are bonded to the relatively small rotor 31 at the rotor sides thereof, the displacement of the thrust plates 32 is reduced at the rotor sides thereof to give rise to a falling phenomenon of the thrust plates 32.

With this embodiment, each of the thrust plates 32 is provided with a projecting section 32a having an outer diameter the same as that of the rotor 31 to equalize the arresting effect of the thrust plates 32 at the opposite ends.

With this arrangement, the displacement of each of the thrust plates 32 at the rotor side and at the side opposite to the rotor due to the centrifugal force can be equalized to eliminate any risk of falling of the thrust plates 32 toward the rotor by optimising the outer diameter $\phi B_3$ and the height $E_1$ of the thrust plates 32 and the outer diameter $\phi A_3$ and the height $E_2$ of the projecting sections 32a of the thrust plate 32 under the given conditions.

Thus, with this embodiment, the risk of falling of the thrust plates and hence that of scoring and seizure of the bearing at the time of high speed rotation can be effectively avoided by preventing the displacement of each of the thrust plates from being differentiated between the rotor side and the side opposite to the rotor.

Additionally, this embodiment of fluid bearing according to the invention provides a remarkable advantage that it operates highly efficiently at the time when the rotary body starts rotating or when it is rotating at low speed if compared with known fluid bearings where the parts of the rotor and the thrust plates that are apt to be deformed most or the corresponding parts of the bearing are so designed as to accommodate the deformation produced as a result of the falling phenomenon of the thrust plates.

Figure 11:
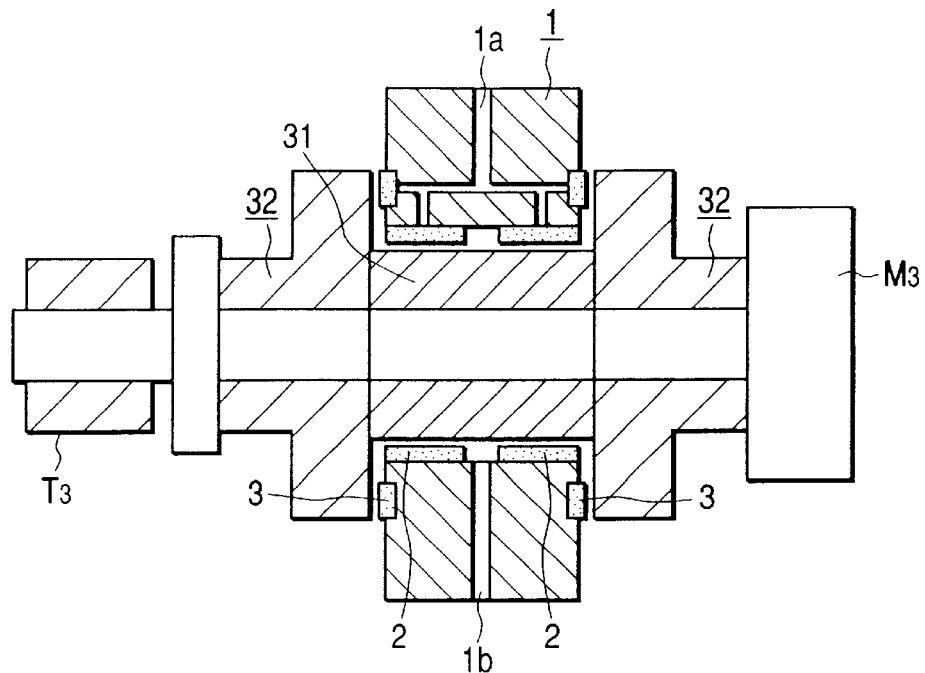
FIG. 11 is a schematic cross sectional view of a rotary drive apparatus realized by using the fluid bearing of FIG. 10.

FIG. 11 is a schematic cross sectional view of a rotary drive apparatus realized by using the fluid bearing of FIG. 10. In FIG. 11, the components that are the same as those of FIG. 10 are denoted respectively by the same reference symbols and will not be described any further.

In the rotary drive apparatus illustrated in FIG. 11, the rotating part of motor $M_3$ is fitted to one of the thrust plates 32 while jig $T_3$ is fitted to the other thrust plate 32. With a rotary drive apparatus having the above described configuration, again, any risk of falling of the thrust plates 32 toward the rotor can be eliminated by providing the thrust plates 32 with a projecting section 32a having an outer diameter the same as that of the rotor 31 and optimizing the values of their dimensions, taking the overall configuration of the apparatus into consideration.

The dimensions of the thrust plates including the outer diameter thereof can be easily optimized by using an appropriate analytical method such as the method of finite elements. Additionally, as a result of experiments, it has been found that a fluid bearing provides satisfactory effects when the height $E_2$ of the projecting sections of the thrust plates is not less than 20% of the height $E_1$ of the thrust plates.

Figure 12:
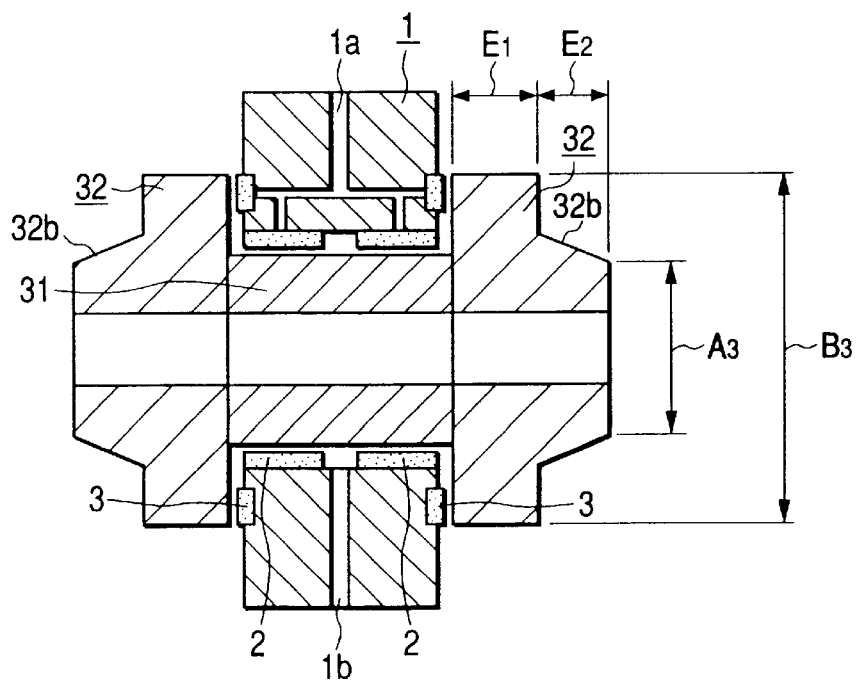
FIG. 12 is a schematic cross sectional view of a fluid bearing realized by modifying the third embodiment.

FIG. 12 is a schematic cross sectional view of a fluid bearing realized by modifying the third embodiment. In this embodiment, the projecting sections 32b of the thrust plates 32 are tapered toward the respective end facets thereof. With this arrangement again, the risk of falling of the thrust plates 32 toward the rotor is eliminated by optimising the outer diameter $\phi A_3$ at the end facets and the height $E_2$ of the projecting sections and the outer diameter $\phi B_3$ and the height $E_1$ of the thrust plates 32.

Note that, while the above described first through third embodiments are static pressure fluid bearings adapted to deliver a gas jet stream to the surfaces of the rotary body facing the bearing surfaces through the bearing pads, the present invention is also applicable to a dynamic pressure fluid bearing that does not comprise bearing pads and is adapted to be used with surfaces facing it and provided with e.g. herring-bone-shaped dynamic pressure generating grooves. With such a dynamic pressure fluid bearing, the risk of falling of the thrust plates due to the centrifugal force generated there can be eliminated by using thrust plates that have a profile same as that of their counterparts of any of the first through third embodiments and their modifications.

As described above, a fluid bearing according to the invention can effectively prevent the falling of thrust plates that can be caused by the centrifugal force generated when rotating at high speed without sacrificing the performance of the bearing at the start and during the low speed rotary operation and also a rotary drive apparatus using such a fluid bearing. Additionally, the risk of falling of the thrust plates and hence that of scoring and seizure of the bearing at the time of high speed rotation of the bearing can be effectively avoided.

The present invention can find various applications besides the above described embodiments. The present invention covers any such applications without departing from the scope of the invention specifically defined by the appended claims.

What is claimed is:

1. A fluid bearing comprising:

a rotary body including a rotor having a cylindrical surface to be borne and at least a thrust plate arranged at an end of said rotor in the sense of axis of rotation; and a housing including a radial bearing section arranged vis-a-vis said surface of said rotor and a thrust bearing section arranged vis-a-vis said thrust plate;

said thrust plate having a hole bored around the axis of rotation of said rotary body, the inner diameter of the hole being greater at the rotor side than at the opposite side.

2. A fluid bearing according to claim 1, wherein the inner peripheral surface of the hole of said thrust plate is provided with a step.

3. A fluid bearing according to claim 1, wherein the inner peripheral surface of the hole of said thrust plate is tapered.

4. A fluid bearing according to claim 1, wherein said rotary body is supported in a non-contact fashion by the static pressure of the fluid found between said radial bearing section and said thrust bearing section and the corresponding surfaces of said rotor and said thrust plate.

5. A fluid bearing according to claim 1, wherein said rotary body is supported in a non-contact fashion by the dynamic pressure of the fluid found between said radial bearing section and said thrust bearing section and the corresponding surfaces of said rotor and said thrust plate.

6. A fluid bearing according to claim 1, wherein a pair of thrust plates are arranged respectively at the opposite ends of said rotor in the sense of the axis of rotation thereof.

7. A fluid bearing according to claim 1, wherein the difference between the largest inner diameter and the smallest inner diameter of the hole of said thrust plate is not less than 3 mm.

8. A rotary drive apparatus comprising:

a fluid bearing according to any one of claims 1, 2 and 4–7; and a motor for driving said rotary body to rotate.

9. A rotary drive apparatus according to claim 8, further comprising:

a jig fitted to said rotary body.

* * * * *